US 9,596,293 B2

(12) United States Patent
Hirano

(10) Patent No.: US 9,596,293 B2
(45) Date of Patent: Mar. 14, 2017

(54) CONTENT TRANSMISSION DEVICE AND NETWORK NODE

(75) Inventor: Jun Hirano, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 364 days.

(21) Appl. No.: 13/814,308

(22) PCT Filed: Sep. 5, 2011

(86) PCT No.: PCT/JP2011/004951
§ 371 (c)(1),
(2), (4) Date: Feb. 5, 2013

(87) PCT Pub. No.: WO2012/032754
PCT Pub. Date: Mar. 15, 2012

(65) Prior Publication Data
US 2013/0166687 A1    Jun. 27, 2013

(30) Foreign Application Priority Data

Sep. 8, 2010   (JP) .................................. 2010-201211

(51) Int. Cl.
*H04L 29/08* (2006.01)
*H04L 9/28* (2006.01)
(Continued)

(52) U.S. Cl.
CPC ............... *H04L 67/10* (2013.01); *H04L 9/28* (2013.01); *H04L 47/24* (2013.01); *H04L 67/322* (2013.01);
(Continued)

(58) Field of Classification Search
CPC ......... H04L 29/08072; H04L 29/08981; H04L 29/0809; H04L 29/06; H04L 67/322;
(Continued)

(56) References Cited

U.S. PATENT DOCUMENTS 6,091,710 A * 7/2000 Mawhinney ........ H04L 12/2602
370/236
2003/0161267 A1* 8/2003 Bitzinger ............ H04L 12/5695
370/229
(Continued)

FOREIGN PATENT DOCUMENTS

JP          2004-180192 A     6/2004
JP          2008-35509 A      2/2008
(Continued)

OTHER PUBLICATIONS

Extended European Search Report issued in Application No. 11 82 3234 dated Feb. 10, 2014.
(Continued)

*Primary Examiner* — Kamal Divecha
*Assistant Examiner* — Clifton Houston
(74) *Attorney, Agent, or Firm* — Pearne & Gordon LLP

(57) ABSTRACT

Disclosed is a technique for guaranteeing high-level QoS for emergent traffic to enable the transmission of the traffic. According to the technique, when a transmission unit 110 sends a content to a reception unit through a network 130, identification information is added to a data packet including the content to indicate that the data packet is a packet to be transmitted to a permitted content using node 150. This packet is duplicated by a network node (e.g., an intermediate node (management node) 140) and forwarded to both the reception unit and the permitted content using node. The content stored on the permitted content using node can be referred to check whether this content is to be transmitted in high priority. A content owner can get compensation (e.g., the cost required for high-priority network transmission) by providing the right of use of the content to the permitted content using node.

16 Claims, 4 Drawing Sheets

(51) Int. Cl.
  *G06F 15/16* (2006.01)
  *H04N 21/6338* (2011.01)
  *H04N 21/64* (2011.01)
  *H04N 21/2187* (2011.01)
  *H04N 21/2547* (2011.01)
  *H04M 3/51* (2006.01)
  *H04L 12/851* (2013.01)
  *H04M 3/487* (2006.01)
  *H04L 12/24* (2006.01)

(52) U.S. Cl.
  CPC ........ *H04L 67/327* (2013.01); *H04M 3/5166* (2013.01); *H04N 21/2187* (2013.01); *H04N 21/2547* (2013.01); *H04N 21/6338* (2013.01); *H04N 21/64* (2013.01); *G06F 2213/0038* (2013.01); *H04L 41/5029* (2013.01); *H04L 67/2814* (2013.01); *H04M 3/487* (2013.01)

(58) Field of Classification Search
  CPC . H04L 47/24; H04L 67/10; H04L 9/28; H04L 67/327; H04L 47/2408; H04L 47/10; G06Q 30/02; H04N 21/6338; H04N 21/64; H04N 21/2187; H04N 21/2547; H04M 3/5166
  USPC .......................................... 709/217
  See application file for complete search history.

(56) References Cited

U.S. PATENT DOCUMENTS

| | | | | |
|---|---|---|---|---|
| 2003/0225863 | A1* | 12/2003 | Kajino | G06F 21/10 709/219 |
| 2004/0071293 | A1* | 4/2004 | Yamamichi | H04L 9/3093 380/277 |
| 2004/0186853 | A1* | 9/2004 | Yamamoto | G11B 20/00086 |
| 2005/0021819 | A1* | 1/2005 | Kilkki | H04L 47/2408 709/232 |
| 2006/0271658 | A1* | 11/2006 | Beliles | G08B 25/08 709/223 |
| 2007/0180119 | A1 | 8/2007 | Khivesara et al. | |
| 2008/0010653 | A1* | 1/2008 | Ollikainen | H04N 7/1675 725/25 |
| 2008/0025318 | A1 | 1/2008 | Knazik et al. | |
| 2008/0098088 | A1* | 4/2008 | Tamano | H04L 12/2809 709/218 |
| 2009/0113560 | A1* | 4/2009 | Kori | G06F 21/10 726/29 |
| 2009/0138547 | A1* | 5/2009 | Boudreau | H04W 4/08 709/203 |
| 2009/0154495 | A1* | 6/2009 | Ojala | H04L 1/0083 370/469 |
| 2009/0187657 | A1 | 7/2009 | Uemitsu | |
| 2009/0232091 | A1 | 9/2009 | Khan | |
| 2009/0252134 | A1* | 10/2009 | Schlicht | H04L 1/0015 370/338 |
| 2010/0014527 | A1* | 1/2010 | Sakauchi | H04L 12/42 370/400 |
| 2010/0020681 | A1 | 1/2010 | Nakashima et al. | |
| 2010/0211475 | A1* | 8/2010 | Nojima | G06Q 30/04 705/26.1 |
| 2011/0277015 | A1* | 11/2011 | Murakami | H04L 63/08 726/3 |
| 2013/0304878 | A1* | 11/2013 | Russell | G06Q 30/0631 709/220 |

FOREIGN PATENT DOCUMENTS

| | | |
|---|---|---|
| JP | 2008-516566 A | 5/2008 |
| JP | 2009-525641 A | 7/2009 |
| JP | 2009-175790 A | 8/2009 |
| JP | 2009-545274 A | 12/2009 |
| WO | 2006/044789 A2 | 4/2006 |

OTHER PUBLICATIONS

International Search Report for PCT/JP2011/004951 dated Sep. 27, 2011.

* cited by examiner

CONTENT TRANSMISSION DEVICE AND NETWORK NODE

TECHNICAL FIELD

The present invention relates to a transmission technique for data requiring high-throughput transmission (high-throughput data).

BACKGROUND ART

With the recent improvements of techniques for user terminals and networks, general users have been allowed to easily send data requiring transmission of contents (including video contents and audio contents). For example, even general users can send, through a network, video/audio contents with pictures or sound picked up by using a communication terminal having an imaging function and a sound pickup function. Further, since the mobilization of communication terminals is in progress, video/audio contents with pictures/sound picked up at various locations can be sent through radio communications by taking advantage of the mobility.

The video/audio contents particularly require high-throughput (broadband and high-priority) transmission from the viewpoint of the volume and real-time performance of the data. Therefore, upon traffic transmission of high-throughput data through a network, the network side is required to provide broadband and high-priority (low-delay, low-jitter, and the like) transmission for the traffic. In such traffic transmission of high-throughput data, the network side provides transmission of packets to be transmitted through specific traffic or packets sent from a specific terminal while guaranteeing higher QoS (Quality of Service) for the traffic transmission than that for normal traffic transmission.

For traffic transmission of high-throughput data, there are a method of payment on a case-by-case basis (pay-as-you-go type) for transmission of traffic for which the guarantee of high-level QoS is required and a method of making a pre-contract to guarantee high QoS for a specific terminal beforehand (advance reservation type). In either method, the network side charges higher communication cost for a specific traffic or a specific communication terminal (e.g., a communication terminal having a specific SIM (Subscriber Identity Module) card) than that of normal traffic transmission to provide a service for broadband and high-priority traffic transmission of high-throughput data.

Patent Document 1 cited below discloses a technique in which when the bandwidths of a communication system are allocated to multiple applications, a bandwidth is allocated preferentially to an application with a high priority level while giving consideration to the total bandwidth of the communication system. Further, Patent Document 2 cited below discloses a technique for adding a program, a parameter, or the like to a packet so that a packet receiving device can process the packet based on the program or the parameter added to the packet.

CITATION LIST

Patent Documents

Patent Document 1: Japanese Patent Application Laid-Open No. 2009-525641
Patent Document 2: Japanese Patent Application Laid-Open No. 2004-180192

The determination that high-throughput transmission is necessary is up to the user side so far. In other words, the user side can get the service for high-throughput transmission as long as the user side subscribes a service for guaranteeing high QoS of a communication terminal on the user side and pays high communication cost corresponding to the pay-as-you-go type or the advance reservation type. However, when limited network resources are used for traffic from users who can pay the high communication cost, if there is traffic necessary to transmit with high throughput in preference to any other traffic for which QoS is guaranteed, there will be a possibility that high QoS cannot be guaranteed for the traffic.

Particularly, when traffic from a transmission unit 1110 is, for example, traffic (such as a press content, a public broadcasting content, or a police/fire department content) for public interest rather than for personal profit, the traffic needs to be transmitted in preference to any other traffic. For example, when a special event such as an incident, an accident, a disaster, or a big concert occurs, it is necessary to tell it to many people quickly and to take police/fire-fighting measures rapidly. However, at the site where such a special event is occurring, it is considered that general users also send video/audio contents from their communication terminals (content transmission becomes more busy than the normal conditions because they send the contents just to satisfy their curiosity), leading to a possibility that the traffic for public interest cannot be transmitted reliably.

For example, as shown in FIG. 7, suppose that multiple users are sending video/audio contents from respective communication terminals (other communication terminals 1190). Suppose here that the other communication terminals 1190 are sending the video/audio contents to a network 1130 (a content receiving device, not shown) from the same area through the same base station. Here, when a specific transmission unit 1110 is to send a video content taken with a camera 1100 to a reception unit 1120 through the network 1130 in the same manner as the other communication terminals 1190, since network resources are already consumed by traffic from the other communication terminals 1190, there is a possibility that high QoS cannot be guaranteed for traffic sent from the transmission unit 1110, or that the transmission unit 1110 is limited in its access to the network 1130.

To guarantee a band for traffic, there are the following pay-as-you-go type and the advance reservation type:

In the pay-as-you-go type, high QoS is guaranteed only for specific traffic, and a user concerned pays for the traffic for which high QoS is guaranteed. For example, the transmission unit 1110 for sending a video content accesses the network 1130 to establish a connection, encodes the video content, and starts transmission to the reception unit 1120. In this case, a session set for transmission of the video content is to be charged per use (pay-as-you-go) in most cases, and the network 1130 provides the transmission of the video content as long as a band is available. However, in a situation of access concentration, the network 1130 side may limit the access from the transmission unit 1110. In such a case, the transmission unit 1110 cannot establish the connection to the network 1130. Even after completion of access to the network 1130, the network 1130 side may not be able to guarantee an available band necessary to provide traffic transmission from the transmission unit 1110 in order to achieve a balance with pay-as-you-go traffic from the other communication terminals 1190 connected to the network 1130 at the same time. Further, since the charging method is a usage-based rate, the communication cost borne by the user will be high. In addition, the network 1130 side cannot distinguish between traffic for personal profit and traffic for public interest. Particularly, in a situation of access concentration, when a special event for which the network resources tend to run out is taking place, it is impossible to transmit the traffic for public interest preferentially.

In the advance reservation type, for example, when a communication terminal accesses the network 1130, the communication terminal can establish a connection preferentially through terminal authentication and can send data in a contracted band. However, the network side is required to secure, in advance, throughput for the contracted band at a point to which the communication terminal has access. When the communication terminal is a mobile terminal capable of accessing at any point, the network side is required to guarantee a band capable of handling accesses of the advance reservation type in any access network at all times. In addition, when multiple communication terminals of the advance reservation type have accessed, the network side is required to guarantee all bands for the multiple communication terminals of the advance reservation type. Therefore, the network side has to be equipped with facilities capable of providing broadband connections as needed. Further, since the network 1130 side cannot distinguish between traffic for personal profit and traffic for public interest, the network 1130 side has to provide preferential transmission regardless of whether traffic from a communication terminal of the advance reservation type is traffic necessary to transmit in preference to any other traffic for which QoS is guaranteed.

The technique disclosed in Patent Document 1 is to allocate bandwidths to packets sent from multiple applications on a certain broadcast server according to the priority levels. In other words, the technique disclosed in Patent Document 1 does not take into account the balance of available bandwidths with other terminals (other broadcast servers), and when an available bandwidth originally allocated to a certain broadcast server is low, this technique does not enable the broadcast server to provide appropriate packet transmission. As mentioned above, the technique disclosed in Patent Document 1 can allocate bandwidths according to the priority levels of multiple applications, respectively, but cannot allocate bandwidths according to the priorities of multiple terminals connected to the network. Especially, when a broadcast server is newly connected to a network whose remaining available bandwidth is insufficient, the technique disclosed in Patent Document 1 cannot solve such a problem that the connection itself cannot be established due to access restriction.

Further, there has conventionally been a method of tagging data packets to indicate priorities or a method of adding a program or a parameter as disclosed in Patent Document 2. Although additional information may be added to data packets also in the present invention, there is no conventional technique able to carry out the operation based on this additional information according to the present invention or achieve the objects and effects of the present invention.

SUMMARY OF THE INVENTION

In order to solve the above problems, it is an object of the present invention to guarantee high QoS for emergent traffic to enable the transmission of the traffic. Further, in order to solve the above problems, it is another object of the present invention to realize traffic transmission with with reduced communication cost on a user side. In addition, in order to solve the above problems, it is still a further object of the present invention to enable a network side to check whether the traffic is required to be transmitted with high throughput in preference to any other traffic for which QoS is guaranteed.

In order to attain the above object, a content transmission device of the present invention is a content transmission device for connecting to a network to send a data packet, including:

a content availability determining unit for determining whether to permit use of a content, which requires high-throughput transmission, on a content receiving node different from any other reception terminal;

a content processing unit for processing a content, the use of which on the content receiving node is determined in the content availability determining unit to be permitted, so that the content will become usable on the content receiving node; and a data transmission unit for sending the network the data packet including the content processed in the content processing unit.

According to this structure, the content transmission device guarantees high QoS for emergent traffic to enable the transmission of the traffic. Further, traffic transmission with reduced communication cost on the user side can be realized. In addition, the network side can check whether the traffic is required to be transmitted with high throughput in preference to any other traffic for which QoS is guaranteed.

Further, in order to attain the above object, a network node of the present invention is a network node existing on a network to forward a data packet including a content sent from a content transmission device connected to the network, including a data transfer processing unit for duplicating a data packet when the data packet, to which first identification information indicating that the data packet is to be transmitted in high priority and broadband and second identification information indicating that use of a content included in the data packet on a content receiving node different from any other reception terminal is permitted, where a limitation on the reception of the content is provided for the content receiving node compared with the other reception terminal, are added, is forwarded, and forwarding one data packet after being duplicated to the other reception terminal and the other data packet after being duplicated to the content receiving node.

According to this structure, the content transmission device guarantees high QoS for emergent traffic to enable the transmission of the traffic. Further, traffic transmission with reduced communication cost on the user side can be realized. In addition, the network side can check whether the traffic is required to be transmitted with high throughput in preference to any other traffic for which QoS is guaranteed.

The present invention has the above structure, having the effect of guaranteeing high QoS for emergent traffic to enable the transmission of the traffic, the effect of realizing traffic transmission with reduced communication cost on the user side, and the effect of enabling the network side to check whether the traffic is required to be transmitted with high throughput in preference to any other traffic for which QoS is guaranteed.

DESCRIPTION OF EMBODIMENTS

Figure 1:
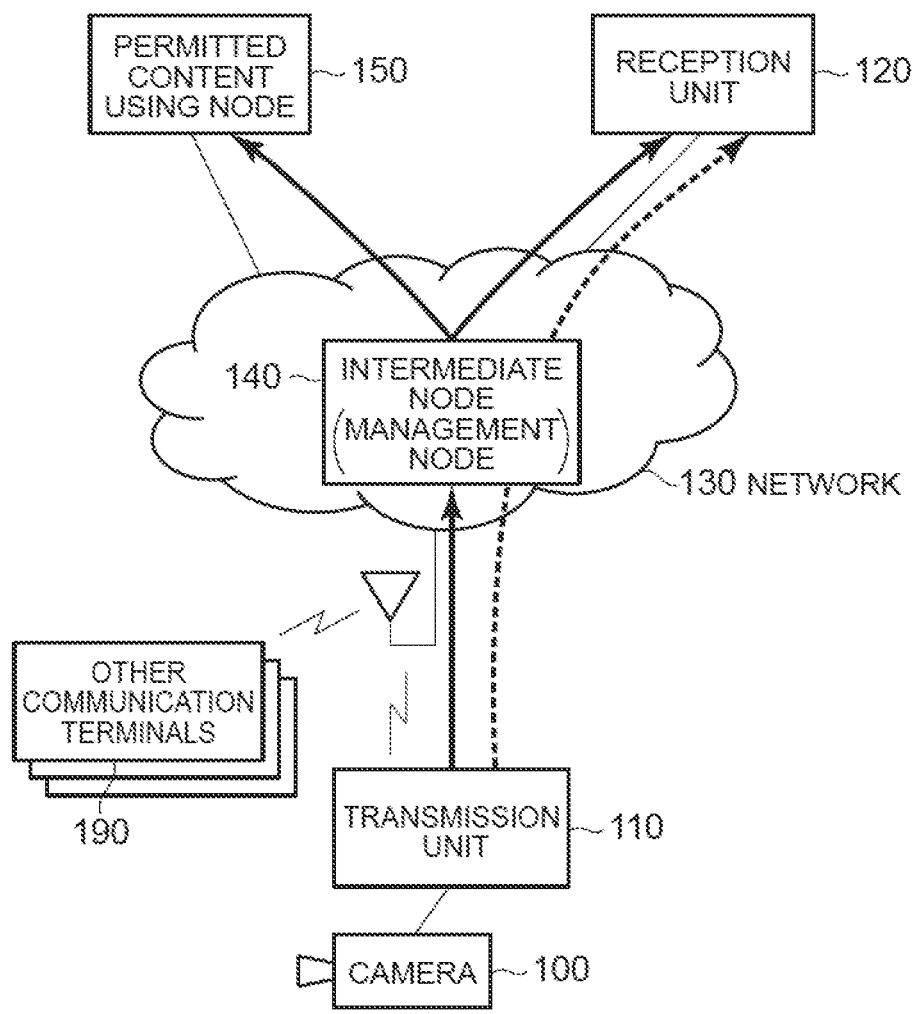
FIG. 1 is a diagram showing an example of a network configuration according to one embodiment of the present invention.

A preferred embodiment of the present invention will now be described with reference to the accompanying drawings. FIG. 1 is a diagram showing an example of a network configuration according to the embodiment of the present invention. Note that FIG. 1 shows both a flow of data in a normal transmission mode according to the present invention and a flow of data in a high-level QoS-guaranteed mode (high-throughput transmission mode) according to the present invention.

Shown in FIG. 1 are a camera 100, a transmission unit 110, a reception unit 120, a network 130, an intermediate node (management node) 140, and a permitted content using node 150.

The transmission unit 110 has the function of acquiring a content taken, for example, with the camera 100, and sending the content toward the reception unit 120. The reception unit 120 has the function of receiving the content sent from the transmission unit 110 through the network 130. The permitted content using node 150 has the function of receiving a particular content among contents (part of the contents) sent from the transmission unit 110 to the reception unit 120. The intermediate node (management node) 140 is located on the network 130, having the function of transmitting contents from the transmission unit 110 to the reception unit 120, the function of setting QoS and routing for transmission of the contents, the function of authenticating the transmission unit 110, the charging function, and the like. The respective functions of the intermediate node (management node) 140 may be distributed to a router, a base station, and a service management server managed by an operator on the network 130, but these functions provided by the operator (telecommunications carrier that owns and manages the network 130) are expressed here as existing on the intermediate node (management node) 140. The permitted content using node 150 is a node owned by the network 130, which may be included in the intermediate node (management node) 140.

In the embodiment of the present invention, for example, it is assumed that contents taken at various shooting locations by using the camera 100 and the transmission unit 110 are sent to a specific reception unit 120 through the network 130. Specifically, it is assumed that the staff of a broadcast station travels with the camera 100 and the transmission unit 110 to a site where a newsworthy event (an incident, an accident, a disaster, or the like) is taking place, sends a content taken at the site to the reception unit 120 at the broadcast station (e.g., a content receiving server at the broadcast station) as a press content, processes the press content in the broadcast station, and broadcasts the content as the content of a news program or the like. In this case, it is also assumed that the network 130 to which the transmission unit 110 is connected for content transmission is a public network.

More commonly, it is assumed that the transmission unit 110 and the reception unit 120 belong to a specific content owner (content right holder) to provide content transmission through the network 130 belonging to an operator for providing a network service. Here, as the most understandable scenario, description will be made of a case where the content taken at the site is used for broadcasting (when the content owner is a broadcast station), but the content owner may be a fire department or a police department.

The connection between the camera 100 and the transmission unit 110, and the connection between the transmission unit 110 and the network 130 may be either wireless connection or wired connection. The contents taken with the camera 100 may be once stored on a recording medium so that the transmission unit 110 will read, from the recording medium, a content(s) to be sent and send the read content(s). Further, the contents taken with the camera 100 may be subjected to any processing before sending the contents. The contents are data for which high throughput is required upon any network transmission, such as video contents and/or audio contents. The data including the contents may be called high-throughput data below.

Here, suppose that the transmission unit 110 is about to send a content to the reception unit 120 via the network 130. However, when the transmission unit 110 sends the content, there is a possibility that the content transmission from the transmission unit 110 is interrupted by accesses or traffic from many other communication terminals 190, or traffic necessary for the content transmission cannot be secured on the network 130.

Particularly, in a scenario assumed in the present invention, it is assumed that the transmission unit 110 connects to the network 130 from a site where any event is taking place to send a content. In this case, it is expected that many other communication terminals 190 try to send contents in the same manner as the transmission unit 110. Specifically, at a concert hall where many people are gathering, many people are expected to send pictures of a concert using communication terminals 190 held respectively by the people, or people who came upon an incident or accident site (so-called a crowd of curious onlookers) are expected to send pictures of the site using the communication terminals 190, respectively. Thus, when the access to a connection station is concentrated or when traffic volume is overloaded, there is a possibility that content transmission from the transmission unit 110 eventually fails. Particularly, when the content to be sent from the transmission unit 110 is a content for public interest as traffic necessary to transmit with high throughput in preference to any other traffic for which QoS is guaranteed, the traffic needs to be transmitted reliably.

In the present invention, in order to enable the network 130 to guarantee high QoS for emergent traffic sent from the transmission unit 110 and transmit the traffic, the network 130 not only transmits the traffic of the content from the transmission unit 110 to the reception unit 120, but also stores the traffic on the permitted content using node 150 so that the owner of the permitted content using node 150

(which may be the same as the operator of the network 130) can use the content stored on the permitted content using node 150.

The owner of the permitted content using node 150 can refer to the content stored on the permitted content using node 150 to check, for example, whether the content is a content for public interest as traffic necessary to transmit with high throughput in preference to any other traffic for which QoS is guaranteed. When the traffic is not traffic necessary to transmit with high throughput in preference to any other traffic for which QoS is guaranteed (if it cannot be controlled directly, the operator of the network 130 is requested to do so), the network 130 controls the traffic transmission in real time under the operation of the intermediate node (management node) 140 (such as to stop the traffic transmission or to handle the traffic in the same manner as normal traffic) and checks it ex-post facto to enable the network 130 to set limits on the traffic from the transmission unit 110 that sent the traffic (or from any other transmission unit of the same owner as the transmission unit 110).

Further, the owner of the permitted content using node 150 can cover (pay in exchange) part of or the overall communication cost for guaranteeing QoS for transmission of the traffic in return for receiving the right of use (e.g., redelivery right) of the content stored on the permitted content using node 150. In other words, the owner of the permitted content using node 150 can pay for compensation required to guarantee QoS for high-throughput transmission of the traffic on the network 130 in compensation for use of the content received from the transmission unit 110.

Figure 2:
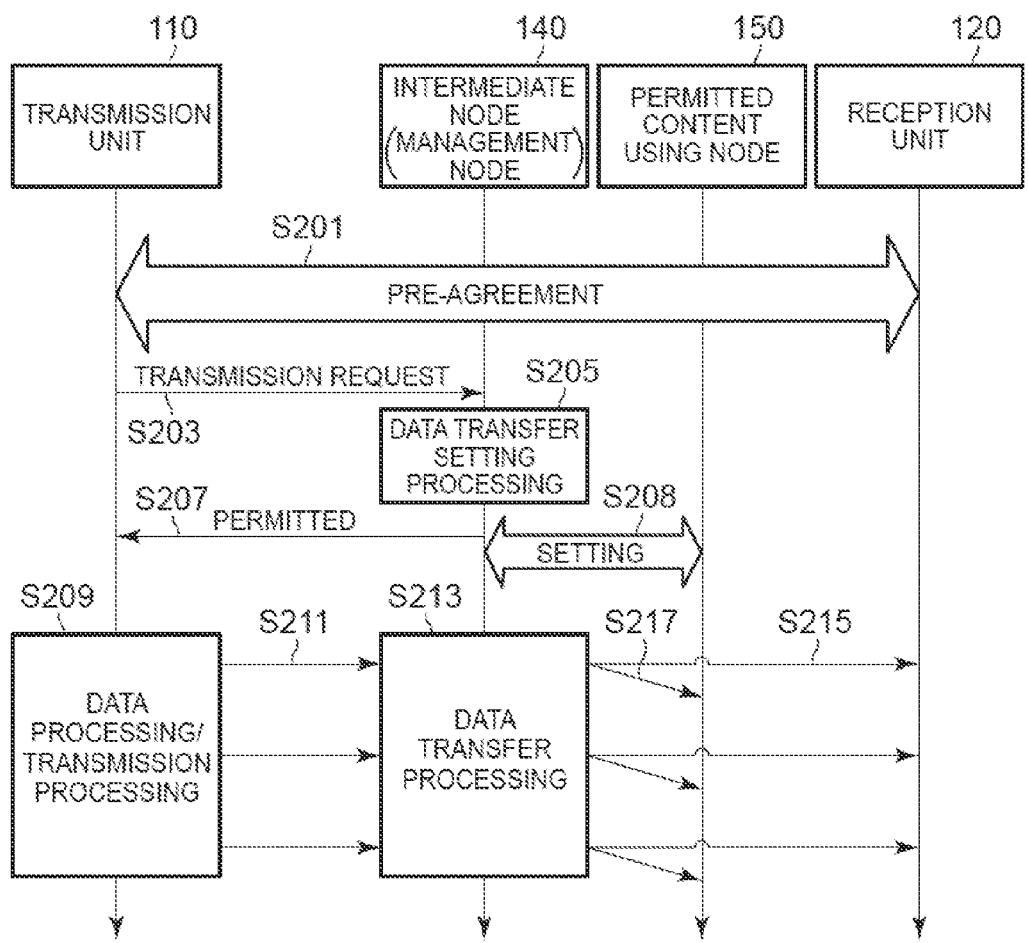
FIG. 2 is a sequence chart showing an example of operation according to the embodiment of the present invention.

Referring to FIG. 2, an example of operation according to the embodiment of the present invention will be described below. FIG. 2 is a sequence chart showing an example of operation according to the embodiment of the present invention.

In FIG. 2, an arrangement is first made in advance among the content owner (the user of the transmission unit 110 and the reception unit 120), the operator (the owner of the intermediate node (management node) 140), and the permitted content user (the user of the permitted content using node 150) in order to guarantee high QoS for contents sent from the transmission unit 110 (step S201).

In this pre-agreement in step S201, it is decided that (part of) a content sent from the transmission unit 110 is provided to the permitted content using node 150, the quality of the content and a use policy (such as utilization purpose and method of utilization) provided to the permitted content using node 150, that the network 130 guarantees QoS for the content sent from the transmission unit 110, and charging rate conditions in that regard. In this specification, providing a content mainly means enabling reference to and use of the content on the permitted content using node 150. After completion of this pre-agreement, agreement/setting information fixed up by the pre-agreement is stored as needed in a location where each node can refer to the information. Note that there is a case where plural pieces of agreement/setting information exist. In this case, the pieces of agreement/setting information are held distinctively from one another so that appropriate information can be selected to configure the settings.

Here, the arrangement is made before a transmission request is sent from the transmission unit 110, but this arrangement may be made statically in advance, or immediately before or immediately after the transmission request is sent from the transmission unit 110. When the transmission unit 110 accesses the network 130 in such a state that the transmission unit 110 is not connected to the network 130, it is desired that the network 130 should perform processing for giving preferential treatment to the access to the network 130 from the transmission unit 110 using a method according to the present invention., Then, the transmission unit 110 makes a transmission request to the network 130 in preparation for sending a content (step S203). In this transmission request, the transmission unit 110 sends the network 130 (specifically, for example, a management node located in the network 130 to manage QoS and the like) a message for giving notice that the transmission unit 110 wants data transmission based on the agreement/setting information according to the determination made by the transmission unit 110 or an instruction from the reception unit 120.

When receiving the transmission request from the transmission unit 110, the intermediate node (management node) 140 of the network 130 performs data transfer setting processing, such as QoS setting, routing setting, and accounting setting, based on the agreement/setting information (step S205). Specifically, the intermediate node (management node) 140 of the network 130 configures the setting of giving access permission preferentially to the content from the transmission unit 110 based on the agreement/setting information to allocate a communication band, the setting of balancing data transmission to an existing destination (reception unit 120) and to the permitted content using node 150 (for example, which may include selection of data to be transferred to each node, data replication, routing, decryption of the content, and the like), and so on. As will be mentioned later, the agreement on and setting of data sent from the transmission unit 110 may be made between the transmission unit 110 and the intermediate node (management node) 140 to perform priority control not only on data to be transmitted from the transmission unit 110 to the permitted content using node 150 but also on data that is never transmitted from the transmission unit 110 to the permitted content using node 150.

Upon completion of the data transfer setting processing (or at the time of completion of a certain level of data transfer setting processing), the intermediate node (management node) 140 sends the transmission unit 110 a notification as a response to the transmission request to indicate that data transmission based on the agreement/setting information is permitted (step S207). Here, a case where data transmission based on the agreement/setting information is permitted will be described in detail. However, when data transmission based on the agreement/setting information cannot be permitted, the intermediate node (management node) 140 sends the transmission unit 110 a notification as a response to the transmission request to indicate that data transmission based on the agreement/setting information cannot be permitted. As a result, the data transmission based on the agreement/setting information is not performed.

The intermediate node (management node) 140 also configures a setting necessary to be made with the permitted content using node 150 if any (step S208). For example, when an encrypted content is routed to the permitted content using node 150 and stored on the permitted content using node 150, key information for decryption may be notified. When a content is encrypted, the permitted content using node 150 may store the content in the encrypted state, or store the content after decrypting the content. Further, the intermediate node (management node) 140 may forward the content to the permitted content using node 150 after decrypting the content so that the permitted content using node 150 will store the content already decrypted.

When receiving a notice of permission of data transmission from the intermediate node (management node) 140, the transmission unit 110 gets into a state of being capable of performing content transmission according to the present invention. Then, the transmission unit 110 starts the content transmission. At this time, the transmission unit 110 sends a data packet including the content while determining whether to make the content to be sent usable on the permitted content using node 150 (whether to permit the use). The determination may be made as to whether to make each content usable on the permitted content using node 150 on a case-by-case basis, or to make a content to be sent for a certain period of time usable on the permitted content using node 150. The transmission unit 110 sends a content to be sent toward the reception unit 120 after performing encoding processing for enabling the intermediate node (management node) 140 to classify the content, content encryption processing, addition of information indicative of data transmission with QoS guaranteed (information indicative of a packet to be transmitted in high priority and broadband), addition of identification information on a permitted content (information indicating that the content is usable on the permitted content using node 150), and the like (steps S209 and S211).

Nodes of the network 130 including the intermediate node (management node) 140 operate based fundamentally on the agreement/setting information. Thus, the permission of access to the network 130 is given preferentially to the transmission unit 110, and a communication band sufficient for transmission is allocated to a content sent from the transmission unit 110.

When forwarding the content sent from the transmission unit 110, the intermediate node (management node) 140 performs packet forwarding processing according to the agreement/setting information (step S213) to forward the content not only to an existing destination (reception unit 120) (step S215), but also to the permitted content using node 150 (step S217). For example, the intermediate node (management node) 140 forwards an original content (the content sent from the transmission unit 110) to the reception unit 120, replicates the content destined to the reception unit 120 (alternatively, which may replicate part of the content or create a quality-degraded content), and forwards the replicated content to the permitted content using node 150. In this case, when the forwarding destination is to be determined, some different variations are feasible. For example, the intermediate node (management node) 140 may determine whether identification information on the permitted content is added to a data packet to forward, to both the reception unit 120 and the permitted content using node 150, the data packet with the identification information on the permitted content added thereto. Alternatively, for example, the intermediate node (management node) 140 may forward all data packets sent from the transmission unit 110 to both the reception unit 120 and the permitted content using node 150. In addition, for example, the intermediate node (management node) 140 may identify a forwarding destination (for example, identification information on a specific permitted content using node 150 is included as the identification information on the permitted content) included in a data packet to forward the data packet to both the reception unit 120 and the specific forwarding destination.

The reception unit 120 can receive the content forwarded from the intermediate node (management node) 140 and use (store, process, deliver, and the like) the content. The permitted content using node 150 can also receive the content (or part of the content) forwarded from the intermediate node (management node) 140 and store the content. The permitted content using node 150 can refer to the stored content or use (store, process, deliver, and the like) the content. When the content is encrypted, the reception unit 120 and the permitted content using node 150 may decrypt the content using keys for decryption (decryption keys) usable respectively.

The above-mentioned basic operation of the intermediate node (management node) 140 in step S213 is to perform processing for forwarding the permitted content received from the transmission unit 110 to both the reception unit 120 and the permitted content using node 150, but there are two or more operational variations depending on the method of processing data packets in the transmission unit 110. The following will describe examples of operation performed by the transmission unit 110 and the intermediate node (management node) 140.

For example, the present invention may be carried out in such a manner that the transmission unit 110 adds the identification information on the permitted content only to a data packet including a content the use of which on the permitted content using node 150 is permitted, and the intermediate node (management node) 140 identifies the identification information on the permitted content as information indicative of being forwarded to the permitted content using node 150, replicates the data packet with the identification information on the permitted content added thereto, and forwards the data packet to the permitted content using node 150. In this case, the content the use of which on the permitted content using node 150 is permitted is forwarded to the permitted content using node 150, but any other content the use of which on the permitted content using node 150 is not permitted is not forwarded to the permitted content using node 150.

The present invention may also be carried out in such a manner that the transmission unit 110 adds the identification information on the permitted content also to a data packet including a content the use of which on the permitted content using node 150 is not permitted and encrypts it in a way that the permitted content using node 150 cannot decrypt it, and the intermediate node (management node) 140 replicates the data packet with the identification information on the permitted content added thereto and forwards it to the permitted content using node 150 as well. In this case, the content the use of which on the permitted content using node 150 is not permitted is also forwarded to the permitted content using node 150. However, since the content is encrypted in a way that the permitted content using node 150 cannot decrypt it, use of the content on the permitted content using node 150 is impossible. Further, for example, the intermediate node (management node) 140 may identify the data packet including the content the use of which on the permitted content using node 150 is not permitted (e.g., the fact that the identification information on the permitted content is not added, or the like) to encrypt it in a way that the permitted content using node 150 cannot decrypt it.

Further, as for a data packet including a content the use of which on the permitted content using node 150 is permitted, the transmission unit 110 may insert, in the data packet, identification information on the permitted content using node 150 on which use of the content is permitted (for example, the identification information on the permitted content includes the identification information on the permitted content using node 150) so that the intermediate node (management node) 140 can identify the permitted content using node 150 as a forwarding destination. This is particularly effective in forwarding a content to two or more specific permitted content using nodes 150 when multiple permitted content using nodes 150 exist.

Further, the present invention may be carried out in such a manner that the transmission unit 110 adds information indicative of being forwarded to the permitted content using node 150 also to a data packet including a content the use of which on the permitted content using node 150 is not permitted and encrypts it in a way that the permitted content using node 150 cannot decrypt it, and the intermediate node (management node) 140 replicates the data packet with the identification information on the permitted content added thereto and forwards it to the permitted content using node 150 as well. In this case, if the intermediate node (management node) 140 determines whether to forward a data packet to the permitted content using node 150 depending on the presence or absence of the identification information on the permitted content, the above-mentioned identification information on the permitted content can be used as information indicative of being forwarded to the permitted content using node 150.

Figure 3:
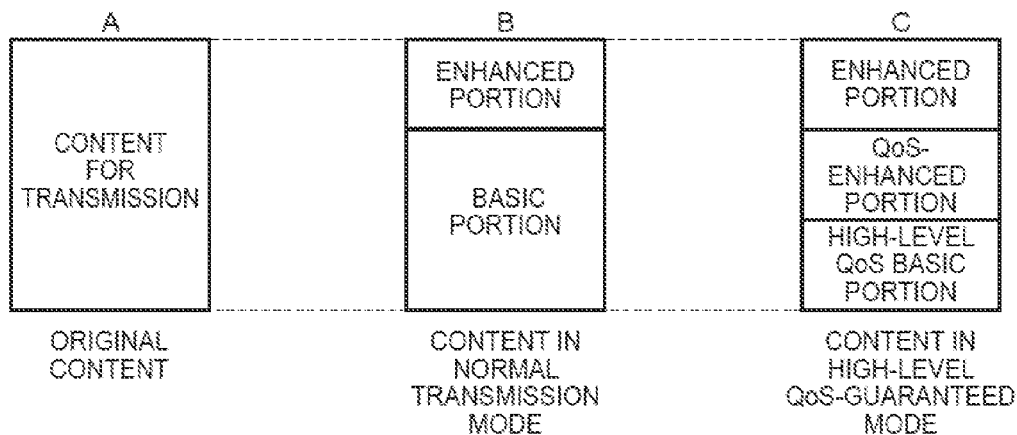
FIG. 3 is a diagram showing an example of data formats of contents to be transmitted in the embodiment of the present invention.

Referring next to FIG. 3, an example of a method for the intermediate node (management node) 140 to forward a content to both the reception unit 120 and the permitted content using node 150 will be described. FIG. 3 is a diagram showing an example of data formats of contents to be transmitted in the embodiment of the present invention.

A in FIG. 3 schematically shows a content to be sent from the transmission unit 110. The content schematically shown at A in FIG. 3 is basically handled as the original form of the highest-definition content in a transmission section though it may be subjected to a certain level of reduction in the amount of information or band limitation from the original content (e.g., the content taken with the camera 100) depending on the condition of an intended transmission path. The content schematically shown at A in FIG. 3 may be called the high-definition content below.

B in FIG. 3 schematically shows a content sent from the transmission unit 110 in a normal transmission mode. In the normal transmission mode, for example, the transmission unit 110 can perform processing for hierarchically structuring the high-definition content to divide it into a basic portion (basic layer) and an enhanced portion (enhanced layer), and send the resulting content to the reception unit 120.

The basic portion is a content of quality desired by the content owner to transmit at the very least. In the normal transmission mode, data of this basic portion is sent with a high-priority setting, including an identifier from which the high-priority setting is found. Further, for example, the transmission unit 110 can provide content protection (encryption processing) available only to the content owner. When hierarchical coding (scalable coding) is used, a component essential for playback of the content is included in the basic portion.

On the other hand, the enhanced portion is that obtained by taking a difference (a high-definition component of the content) from the high-definition content after the basic portion is encoded. In other words, the basic portion and the enhanced portion can be combined to create the high-definition content. Data of this enhanced portion is assumed to be sent as a non-priority data. Therefore, data loss may occur in the transmission path, but even when the data of the enhanced portion is lost, the content can be played back by using the data of the basic portion alone. Further, for example, like the basic portion, the transmission unit 110 can provide the enhanced portion with content protection (encryption processing) available only to the content owner.

Further, as mentioned above, since the content essential for playback of the content is included in the basic portion, the transmission unit 110 does not have to send the enhanced portion (particularly, at the time of guaranteeing high-level QoS shown at C in FIG. 3 to be described below).

C in FIG. 3 schematically shows a content sent from the transmission unit 110 in a high-level QoS-guaranteed mode. At the time of guaranteeing high-level QoS, for example, the transmission unit 110 can further perform processing for hierarchically structuring the basic portion to divide it into a high-level QoS basic portion and a QoS-enhanced portion, and send the resulting content to the reception unit 120.

The high-level QoS basic portion is a content desired to transmit to the permitted content using node 150 at the time of guaranteeing high-level QoS, to which both the content owner and the owner of the the permitted content using node 150 can refer. It is better that the quality of the high-level QoS basic portion is defined by the pre-agreement in terms of the resolution, the screen size, the frame rate, or the like. In the high-level QoS-guaranteed mode, data of this high-level QoS basic portion is sent with a high-priority setting, including an identifier indicating that the high-level QoS is required, and further, as the need arises, an identifier from which the high-priority setting is found. Note that the identifier indicating that the high-level QoS is required and the identifier from which the high-priority setting is found may be put together into one identifier. Further, for example, the transmission unit 110 can provide the high-level QoS basic portion with content protection (encryption processing) available to both the content owner and the permitted content user. When hierarchical coding is used, a component essential for playback of the content is included in the high-level QoS basic portion.

On the other hand, the QoS-enhanced portion is that obtained by taking a difference from the basic portion after the high-level QoS basic portion is encoded, i.e., it is a content to which the content owner can refer. In other words, the high-level QoS basic portion and the QoS-enhanced portion can be combined to create the basic portion. In the high-level QoS-guaranteed mode, data of this QoS-enhanced portion is sent with a high-priority setting, including an identifier indicating that the high-level QoS is required, and further, as the need arises, an identifier from which the high-priority setting is found. Note that the identifier indicating that the high-level QoS is required and the identifier from which the high-priority setting is found may be put together into one identifier. Further, for example, the transmission unit 110 can provide the QoS-enhanced portion with content protection (encryption processing) available only to the content owner.

When the normal transmission mode and the high-level QoS-guaranteed mode are defined as mentioned above, the transmission unit 110 can provide normal content transmission in the normal transmission mode and provide transmission of such a content that can be stored on the permitted content using node 150 to content the transmission of which is required to guarantee high-level QoS) in the high-level QoS-guaranteed mode. In other words, the transmission unit 110 sends normal contents particularly unnecessary to guarantee high-level QoS in the format shown at B in FIG. 3. Thus, at least the basic portion shown at B in FIG. 3 is transmitted from the transmission unit 110 to the reception unit 120. As mentioned above, since the content can be played back by using the data of the basic portion alone, the reception unit 120 can play back the content even if the enhanced portion is not delivered from the transmission unit 110 to the reception unit 120. On the other hand, the transmission unit 110 sends a content necessary to guarantee high-level QoS (the content sent in step S209 of FIG. 2) in the format shown at C in FIG. 3. Thus, at least the high-level QoS basic portion and the QoS-enhanced portion shown at C in FIG. 3 are transmitted with high throughput from the transmission unit 110 to the reception unit 120, and at least the high-level QoS basic portion shown at C in FIG. 3 is transmitted with high throughput from the transmission unit 110 to the permitted content using node 150.

In this case, transmitted from the transmission unit 110 to the permitted content using node 150 is only the high-level QoS basic portion of lower quality (meaning a smaller amount of information) than the high-level QoS basic portion and the QoS-enhanced portion transmitted from the transmission unit 110 to the reception unit 120. However, since the permitted content using node 150 stores the content for the purpose of referring to and checking for the content, and secondary use of the content, the quality of the original content does not need to be kept as it is. The content owner can intentionally degrade the quality of a content to be provided to the owner of the the permitted content using node 150. Further, the transmission unit 110 can insert, in a content to be stored on the permitted content using node 150, additional information, such as a watermark, a digital watermark, identification information on the content itself, or tracking information for managing secondary use, to prevent the abuse of the content to be stored on the permitted content using node 150. Further, an existing content playback control system for preventing the abuse of the content (e.g., digital rights management (DRM), copy once, dubbing 10, or the like) may be used to set limits on the usage count and usage state of the content.

In the above description, it is assumed that at least the basic portion is transmitted from the transmission unit 110 to the reception unit 120 in the normal transmission mode. It is also assumed that at least the high-level QoS basic portion and the QoS-enhanced portion (basic portion) are transmitted from the transmission unit 110 to the reception unit 120 in the high-level QoS-guaranteed mode, and the high-level QoS basic portion is replicated on the intermediate node (management node) 140 so that the high-level QoS basic portion will be transmitted from the transmission unit 110 to the permitted content using node 150. However, the present invention is not limited to the above assumptions. For example, in the high-level QoS-guaranteed mode, a content of equal quality may be sent to both the reception unit 120 and the permitted content using node 150. In this case, for example, the transmission unit 110 may provide the basic portion with content protection available to both the content owner and the permitted content user in the high-level QoS-guaranteed mode, and provide transmission by adding an identifier indicating that high-level QoS is further needed so that the intermediate node (management node) 140 will transmit the basic portion to both the reception unit 120 and the permitted content using node 150. Thus, when the content owner provides the content of equal quality to the owner of the the permitted content using node 150, it is particularly useful to insert additional information for abuse prevention for preventing the abuse of the content.

Figure 4:
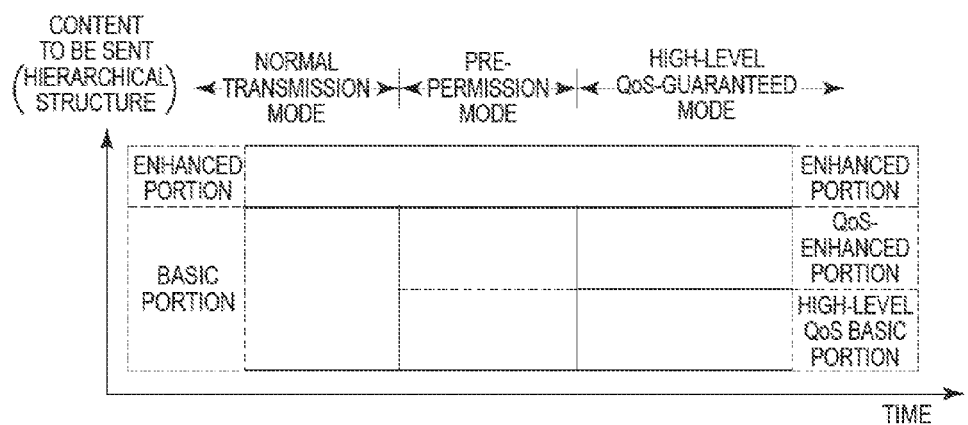
FIG. 4 is a diagram showing an example of transition from a normal transmission mode to a pre-permission mode and then from the pre-permission mode to a high-level QoS-guaranteed mode in the embodiment of the present invention.

Further, in addition to the above normal transmission mode and high-level QoS-guaranteed mode, an intermediate mode (which may be called a pre-permission mode below) may be defined. In the pre-permission mode, the content is transmitted with a high-level of QoS, but no usable content is provided to the permitted content using node. For example, this pre-permission mode is useful for a rehearsal in a broadcasting scenario, or when privacy information is included in the content in a police scenario. The following will describe the pre-permission mode with reference to FIG. 4. FIG. 4 is a diagram showing an example of transition from the normal transmission mode to the pre-permission mode and then from the pre-permission mode to the high-level QoS-guaranteed mode in the embodiment of the present invention.

The content transmission in the normal transmission mode is basically the same as that in the conventional. In other words, the content sent from the transmission unit 110 is delivered to the reception unit 120 via the network 130. Note that FIG. 4 takes, as an example, a case where the content is subjected to hierarchical coding. In the normal transmission mode, for example. the transmission unit 110 sends the basic portion with the high-priority setting and the enhanced portion with the non-priority setting.

Here, it is assumed a case of transition from the normal transmission mode to the high-level QoS-guaranteed mode. In this case, the transition from the normal transmission mode to the high-level QoS-guaranteed mode may be made immediately. However, in order to check for QoS guarantee requested in high-level QoS, the mode may transition to the high-level QoS-guaranteed mode after once transition to an intermediate mode (pre-permission mode).

The pre-permission mode is an intermediate state between the normal transmission mode and the high-level QoS-guaranteed mode, which may involve utilization limitations such as to enable utilization only for a certain period of time based on the agreement. This pre-permission mode is adopted when the content owner desires to guarantee high-level QoS for the content like in the high-level QoS-guaranteed mode, but wants not to provide any usable content to the permitted content using node 150. Like in the high-level QoS-guaranteed mode, the operator guarantees high-level QoS for the content sent from the transmission unit 110, but the operator does not transmit the content sent from the transmission unit 110 to the permitted content using node 150, or transmits the content in such a state that the content cannot be referred to or used on the permitted content using node 150. In other words, the same operation as in the high-level QoS mode is performed in the pre-permission mode, except that the permitted content is not provided to the permitted content using node 150 in a usable state. In this specification, the content determined by the transmission unit 110 to transmit in the pre-permission mode may be called a temporarily unavailable content.

In the pre-permission mode, for example, the transmission unit 110 can further add an identifier indicating that high-level QoS is required to the basic portion while providing content transmission in the format (format shown at B in FIG. 3) of the normal transmission mode. An identifier indicative of the pre-permission mode may also be added. When receiving the basic portion from the transmission unit 110, the intermediate node (management node) 140 forwards the basic portion to the reception unit 120 and the permitted content using node 150. Note that the basic portion may be so encrypted that it cannot be decrypted on the permitted content using node 150. The permitted content using node 150 may store the received basic portion as it is (but in an unusable state), or discard it without storing it. Further, if it is surely determined that the the basic portion is not stored on the permitted content using node 150 and the content pertaining to the basic portion is not used by the permitted content using node 150, the transmission unit 110 will not necessarily need to encrypt the basic portion. Alternatively, when receiving the basic portion from the transmission unit 110, the intermediate node (management node) 140 may disable the basic portion from being forwarded to the permitted content using node 150.

Further, in the pre-permission mode, for example, the transmission unit 110 provides content transmission in the format (format shown at C in FIG. 3) of the high-level QoS-guaranteed mode and adds an identifier indicating that high-level QoS is required for the high-level QoS basic portion without adding an identifier indicative of the permitted content. An identifier (identifier indicative of a temporarily unavailable content) may also be added. When receiving the high-level QoS basic portion from the transmission unit 110, the intermediate node (management node) 140 forwards the high-level QoS basic portion to the reception unit 120 and the permitted content using node 150. The high-level QoS basic portion may be so encrypted that it cannot be decrypted on the permitted content using node 150. The permitted content using node 150 may store the received high-level QoS basic portion as it is (but in an unusable state), or discard it without storing it. Further, if it is surely determined that the high-level QoS basic portion is not stored on the permitted content using node 150 and the content pertaining to the high-level QoS basic portion is not used by the permitted content using node 150, the transmission unit 110 will not necessarily need to encrypt the high-level QoS basic portion. Alternatively, when receiving the high-level QoS basic portion from the transmission unit 110, the intermediate node (management node) 140 may disable the high-level QoS basic portion from being forwarded to the permitted content using node 150.

As mentioned above, since the operation of the pre-permission mode is performed between the normal transmission mode and the high-level QoS-guaranteed mode, the transmission unit 110 can make a practice (rehearsal) of providing content transmission in the high-level QoS-guaranteed mode by using the content unable to refer to or use on the permitted content using node 150 before the actual content transmission (real part) in the high-level QoS-guaranteed mode. Although the transition from the normal transmission mode to the high-level QoS-guaranteed mode could fail because of a vast change in state, since the state of content transmission in the pre-permission mode as an intermediate state is maintained by sending the temporarily unavailable content, the transition to the high-level QoS-guaranteed mode and the content transmission can be achieved easily without fail. Further, the transmission unit 110 can provide transmission in the pre-permission mode in the midst of content transmission in the high-level QoS-guaranteed mode to alter the content in the high-level QoS-guaranteed mode into the content unable to refer to or use on the permitted content using node 150 (i.e., the temporarily unavailable content).

The above describes the intermediate state as the pre-permission mode between the normal communication mode and the high-level QoS-guaranteed mode. However, as mentioned above, the operation of the pre-permission mode does not necessarily need to be performed just before switching from the normal communication mode to the high-level QoS-guaranteed mode (like the case of a rehearsal). It is desired to perform the operation of the pre-permission mode when the content becomes inappropriate for reference or use on the permitted content using node 150 during content transmission (when information pertaining to privacy needs to be sent) and hence it is desirable to guarantee high-level QoS for the content on a case-by-case basis. In this case, the operation in the pre-permission mode is performed between the high-level QoS-guaranteed mode and the high-level QoS-guaranteed mode, or before transition to the normal communication mode after the high-level QoS-guaranteed mode. The content processing performed in each mode is performed in the same manner along the mode transition, except that the order of mode transitions is different.

Figure 5:
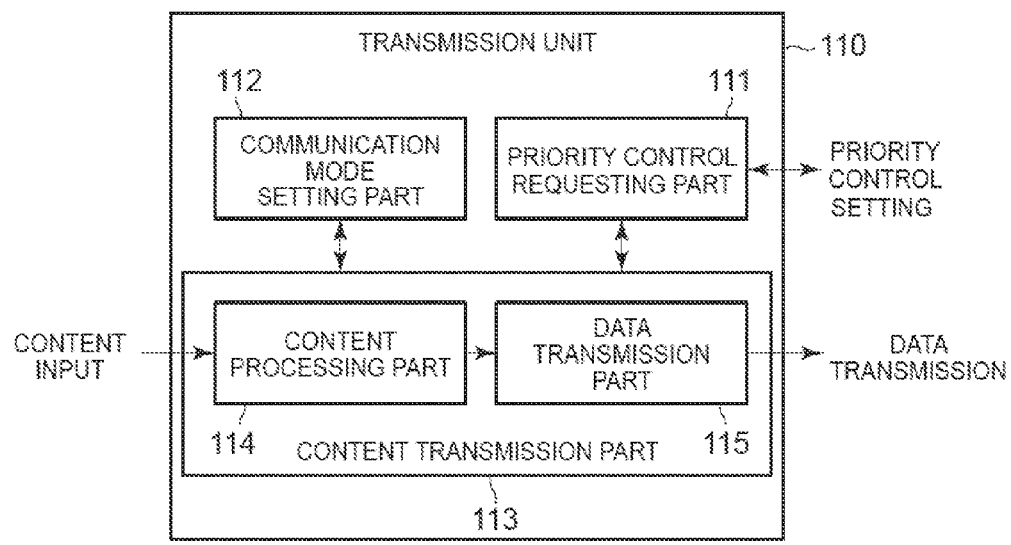
FIG. 5 is a block diagram showing an example of the structure of a transmission unit 110 according to the embodiment of the present invention.

Next, an example of the structure of the above transmission unit 110 will be described. FIG. 5 is a block diagram showing an example of the structure of the transmission unit 110 according to the embodiment of the present invention. Although each function of the transmission unit 110 is illustrated as a block in FIG. 5, each block can be implemented by hardware or software.

The transmission unit 110 shown in FIG. 5 has a priority control requesting unit 111, a communication mode setting unit 112, and a content transmission unit 113 to enable the transmission unit 110 to perform the processing pertaining to the transmission unit 110 shown in FIG. 2.

The priority control requesting unit 111 has the function of requesting a network connection and content transmission (content transmission based on the setting of high-level QoS-guaranteed mode) under priority control agreed beforehand based on contract information or priority control agreed on a case-by-case basis. Depending on this request for priority control, agreements are made with the network 130 (the operator of the network 130), such as on providing a priority control service for a fixed period of time (as to how long the priority control service is received), providing a certain level of content (as to how much level of priority control is received), and limitation on the range of use (as to from which base station or an access network the connection is established, or for which source and destination the priority control of the content is received.

When accessing the priority control at the time of a connection request (access request) to the network 130, the transmission unit 110 establishes a connection in an access control mode capable of accessing the network 130 preferentially. In this case, the connection itself is almost the same as the normal connection, and the transmission unit 110 tries to establish the connection based on identification information for receiving priority access or in the access control mode capable of gaining priority access. On the other hand, when accessing the priority control in such a state that the connection to the network 130 is already established, the transmission unit 110 negotiates, with the network 130, the setting of data connection (session/flow) capable of receiving priority control or identification information for data capable of receiving priority control. When the encryption of a content is used, the setting of a key for decrypting (part of) a permitted content to be stored on a permitted content using node is also made, but the key may be shared in advance between the transmission unit 110 and the permitted content using node 150.

The communication mode setting unit 112 has the function of determining whether to have the network 130 perform priority control of content transmission, and indicating the determination result to the content transmission unit 113. Specifically, the communication mode setting unit 112 determines in which communication mode, among the above-mentioned normal transmission mode, pre-permission mode, and high-level QoS-guaranteed mode, the operation of the transmission unit 110 should be performed, and indicates a content processing method to the content transmission unit 113 to set up the operation of the transmission unit 110 in the communication mode determined. Based on the mode determination mentioned above, the communication mode setting unit 112 can determine whether to permit use of the content on the permitted content using node 150.

The content transmission unit 113 has the function of performing content processing in accordance with instructions from the communication mode setting unit 112. The content transmission unit 113 further has a content processing unit 114 and a data transmission unit 115.

In addition to processing for normal content transmission, the content processing unit 114 has the function of specifying a content, on which the transmission unit 110 has the network 130 perform priority control (which may be set by an automatic program or set manually), and adding identification information for receiving priority control on normally sent contents. Specifically, for example, the content processing unit 114 adds, to the basic portion, an identifier indicative of high-priority control (identifier indicative of data for receiving priority control) in the normal transmission mode, or adds, to the high-level QoS basic portion and the QoS-enhanced portion, an identifier indicative of high-priority control in the high-level QoS-guaranteed mode and adds, to the high-level QoS basic portion, an identifier indicative of a permitted content (identifier indicative of being stored in the permitted content). When identification is made in a session/flow, it is better to set an identifier for the set session/flow in a manner to be distinct by additional information such as an ID or a header. When identification is made in a session, a session for high-throughput data can be so set that content transmission will be performed in the session (e.g., a corresponding bearer, an IP address (source address/destination address, a session ID, etc.). When identification is made in a flow, a flow for high-throughput data can be set by a flow ID or the like.

Further, when the content is encrypted, (part of or the overall) content of an agreed level is used as a decryption key to perform encryption in addition to a normal encryption mode. This enables the original destination (reception unit 120) to decrypt the overall content and the content providing destination (permitted content using node 150) to decrypt the agreed level of content. When a partial content (e.g., the high-level QoS basic portion) is stored on the permitted content using node 150, it is better to hierarchize the original content and the partial content in order to avoid the duplication of data. For example, the partial content can be decrypted at the original destination and the content providing destination, and a portion of the original content as a difference from the partial content can be decrypted at the original destination alone. Since the number of content destinations is plural, it is better that the network 130 side can control transmission paths to avoid the duplication of sent data. For example, the original destination and the content providing destination are sorted on the network 130 side to provide bi-cast transmission (multicast transmission). When a data packet to be transmitted to both the original destination and the content providing destination can be distinguished from other data packets by the above-mentioned hierarchized structure or the like, the network 130 side can perform bi-cast transmission (multicast transmission) processing only on the data packet concerned.

As for the content the use of which on the permitted content using node 150 is permitted, the content processing unit 114 processes the content so that the content can be used on the permitted content using node 150. Further, when additional information for abuse prevention is added to the content to be stored on the permitted content using node 150, the content processing unit 114 performs processing for inserting the additional information for abuse prevention into corresponding data. When the additional information for abuse prevention is inserted, it is better to calculate a difference from additional information for abuse prevention to be added later in order to avoid duplication. For example, the additional information for abuse prevention may be a log or copyright notice of the providing source (content owner) capable of indicating that the content is provided to a providing destination.

The data transmission unit 115 has the function of providing data transmission in the normal transmission mode, the pre-permission mode, or the high-level QoS-guaranteed mode based on an instruction from the communication mode setting unit 112. The data transmission unit 115 sends, with high throughput, data for which priority control is required. When switching between sessions is required, the data transmission unit 115 switches between sessions arbitrarily.

Figure 6:
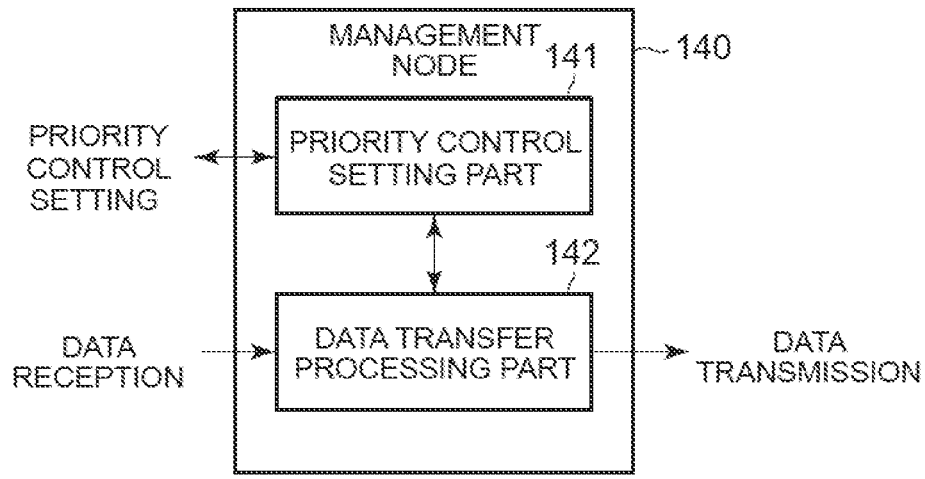
FIG. 6 is a block diagram showing an example of the structure of an intermediate node (management node) according to the embodiment of the present invention.
Figure 7:
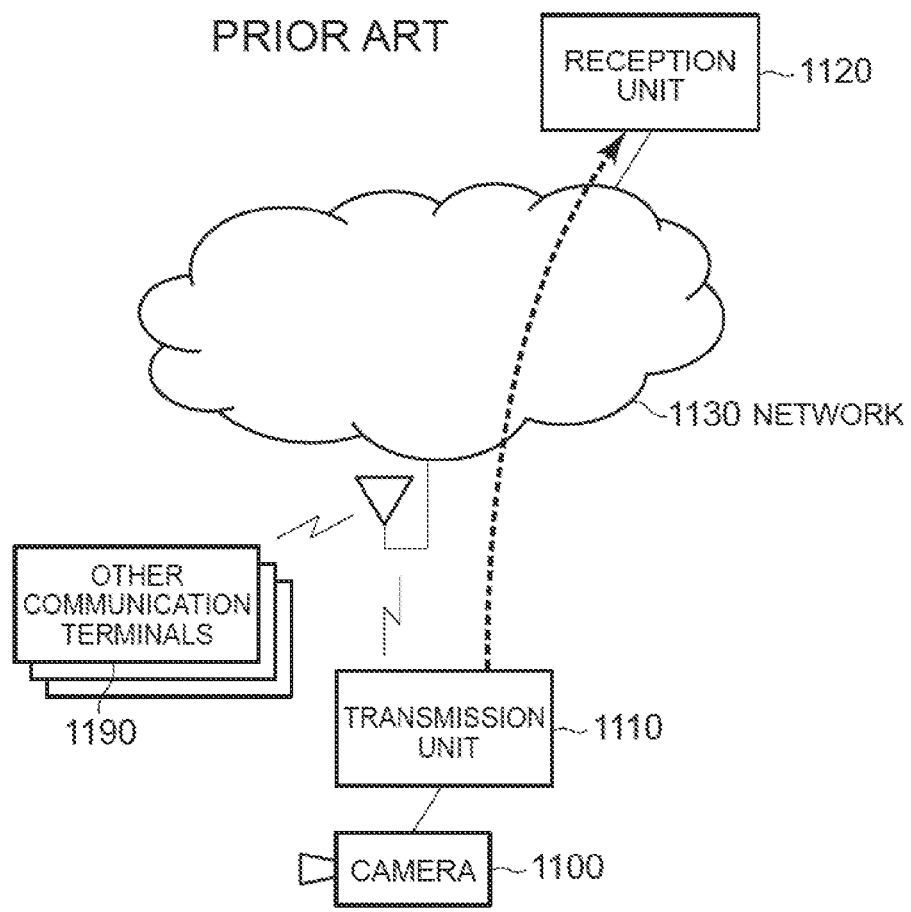
FIG. 7 is a diagram showing an example of a conventional network configuration.

Next, an example of the structure of the above-mentioned intermediate node (management node) 140 will be described. FIG. 6 is a block diagram showing an example of the structure of the intermediate node (management node) according to the embodiment of the present invention. Although each function of the intermediate node (management node) 140 is illustrated as a block in FIG. 6, each block can be implemented by hardware or software.

The intermediate node (management node) 140 shown in FIG. 6 has a priority control setting unit 141 and a data transfer processing unit 142 to enable the intermediate node (management node) 140 to perform the processing pertaining to the intermediate node (management node) 140 shown in FIG. 2.

The priority control setting unit 141 has the function of setting QoS and permit access on the network 130 to perform priority control on the transmission of high-throughput data. The priority control setting unit 141 can control devices (e.g., a base station) for control access to the network 130, and perform packet forwarding control on a data transfer function in each network node (including the data transfer processing unit 142 of the own node).

The priority control setting unit 141 also has the function of controlling the network connection and content transmission of the transmission unit 110 (content transmission based on the setting of high-level QoS-guaranteed mode) under priority control agreed beforehand based on contract information or priority control agreed on a case-by-case basis. Depending on this setting of priority control, agreements are made with the transmission unit 110 (the owner of the transmission unit 110), such as on providing a priority control service for a fixed period of time (as to how long the priority control service is provided), providing a certain level of content (as to how much level of priority control is provided), and limitation on the range of use (as to from which base station or an access network the connection is established, or for which source and destination the priority control of the content is provided. Further, the forwarding destination of packet data and the forwarding method in the data transfer processing unit 142 are set.

The data transfer processing unit 142 has the function of distinguishing data to be subjected to priority control of packet data received from the transmission unit 110 and perform forwarding processing accordingly. Specifically, based on identification information added to the packet received from the transmission unit 110, the data transfer processing unit 142 can determine whether the packet is a packet to be transmitted with high throughput. and further whether the packet includes a content to be stored on the permitted content using node 150 arbitrarily to provide transmission with high-level QoS guaranteed or to duplicate the packet in order to provide high-throughput transmission to both the original destination and the permitted content using node 150 (e.g., bi-cast transmission (multicast transmission)). Further, when a permitted content to be stored on the permitted content using node 150 is encrypted, the permitted content may be stored on the permitted content using node 150 after being subjected to decryption processing.

Further, the intermediate node (management node) 140 can make an inquiry to an AAA (Authentication, Authorization and Accounting) server about authentication information, check with an HSS (Home Subscription Server) about a change in the state of charging information or make a setting, and update the QoS setting for a PCRF (Policy and Charging Rules Function). As mentioned above, the intermediate node (management node) 140 is a representation of the functions put together on the network 130 side, and each function implemented on the intermediate node (management node) 140 may be distributed to each node of the network 130.

INDUSTRIAL APPLICABILITY

The present invention has the advantageous effects of guaranteeing high QoS for emergent traffic to enable the transmission of the traffic, providing traffic transmission with reduced communication cost on the user side, and enabling the network side to check whether the traffic needs to be transmitted with high throughput in preference to any other traffic for which QoS is guaranteed. The present invention is applicable to a data transmission technique requiring high-throughput transmission.

The invention claimed is:

1. A content transmission device for connecting to a network to send a data packet, comprising hardware configured to:
   acquire the data packet including a content, which requires high-throughput transmission, and is to be transmitted to a reception unit through the network;
   determine whether to permit use of a part of the content on a permitted content receiving node;
   process the part of the content, when the use of the part of the content on the permitted content receiving node is determined to be permitted, so that the content will become usable on the permitted content receiving node;
   transmit, through the network, the data packet including the same processed content to both the reception unit and the permitted content receiving node when the use of the part of the content on the permitted content receiving node is determined to be permitted,
   transmit, through the network, the acquired data packet including the content only to the reception unit when the use of the part of the content on the permitted content receiving node is determined not to be permitted,
   use processing for hierarchically structuring the part of the content, the use of which on the content receiving node is determined to be permitted, to divide the part of the content into a basic portion and an enhanced portion including information for compensating an amount of information on the basic portion in order to create a data packet including the basic portion and a data packet including the enhanced portion,
   encrypt the data packet including the basic portion by using such a key that can be decrypted at both the reception unit and the content receiving node, and
   encrypt the data packet including the enhanced portion by using such a key that cannot be decrypted at the content receiving node, and
   add first identification information and second identification information to the data packet including the basic portion and the data packet including the enhanced portion, where the first identification information indicates that the data packet is a packet to be transmitted in high priority and broadband, and the second identification information indicates that the content included in the data packet is usable on the content receiving node.

2. The content transmission device according to claim 1, further configured to add first identification information and second identification information to the data packet including the part of the content, the use of which on the content receiving node is determined to be permitted, where the first identification information indicates that the data packet is a packet to be transmitted in high priority and broadband, and the second identification information indicates that the content included in the data packet is usable on the content receiving node.

3. The content transmission device according to claim 2, further configured to encrypt the part of the content, the use of which on the content receiving node is determined to be permitted, by using such a key that can be decrypted at both the reception unit and the content receiving node.

4. The content transmission device according to claim 3, further configured to perform encryption using such a key that can be decrypted individually at each of a plurality of content receiving nodes when there are the plurality of content receiving nodes.

5. The content transmission device according to claim 1, further configured to perform processing for abuse prevention on the part of the content, the use of which on the content receiving node is determined to be permitted.

6. The content transmission device according to claim 5, further configured to make a setting of being able to be decrypted only in the content receiving node in order to prevent the abuse of the part of the content, the use of which on the content receiving node is determined to be permitted.

7. The content transmission device according to claim 1, further configured to encrypt the data packet for the part of the content, the use of which on the content receiving node is determined not to be permitted, by using such a key that cannot be decrypted at the content receiving node.

8. The content transmission device according to claim 1, further configured to encrypt the data packet including the basic portion and the data packet including the enhanced portion by using such a key that can be decrypted at both the reception unit and the content receiving node, and add the first identification information and the second identification information to the data packet including the basic portion, where the first identification information indicates that the data packet is a packet to be transmitted in high priority and broadband, and the second identification information indicates that the content included in the data packet is usable on the content receiving node, and add the first identification information to the data packet including the enhanced portion without adding the second identification information.

9. The content transmission device according to claim 1, further configured to encrypt a data packet including a temporarily unavailable content by using such a key that cannot be decrypted at the content receiving node when the content the use of which on the content receiving node is determined not to be permitted is the temporarily unavailable content, the use of which on the content receiving node is not temporarily permitted.

10. The content transmission device according to claim 9, further configured to add first identification information and second identification information to the data packet including the temporarily unavailable content, where the first identification information indicates that the data packet is a packet to be transmitted in high priority and broadband, and the second identification information indicates that the content included in the data packet is usable on the content receiving node.

11. The content transmission device according to claim 1, further configured to add first identification information to a data packet including a temporarily unavailable content without adding second identification information when the content the use of which on the content receiving node is determined not to be permitted is the temporarily unavailable content, the use of which on the content receiving node is not temporarily permitted, where the first identification information indicates that the data packet is a packet to be transmitted in high priority and broadband, and the second identification information indicates that the content included in the data packet is usable on the content receiving node.

12. The content transmission device according to claim 1, further configured to add first identification information to a data packet including the content the use of which on the content receiving node is determined not to be permitted, without adding second identification information, where the first identification information indicates that the data packet is a packet to be transmitted in high priority and broadband, and the second identification information indicates that the content included in the data packet is usable on the content receiving node.

13. The content transmission device according to claim 1, further configured to make, with the network, a setting of receiving priority control for transmission of a data packet related to the content, the use of which on the content receiving node is permitted, in compensation for forwarding the content to the content receiving node.

14. The content transmission device according to claim 13, further configured to make, with the network, a setting of receiving priority control for transmission of a data packet related to the content, the use of which on the content receiving node is not permitted, in compensation for forwarding the content to the content receiving node.

15. A network node existing on a network to forward a data packet including a content, which requires high-throughput transmission and is to be transmitted to a reception unit, sent from a content transmission device connected to the network, the network node comprising hardware configured to:
  acquire, from the content transmission device, the data packet including a content, which requires high-throughput transmission, and is to be transmitted to a reception unit through the network;
  determine whether or not the data packet is a packet to be transmitted with high throughput based on first identification information added to the data packet, the first identification information indicating that the data packet is to be transmitted in high priority and broadband,
  determine whether or not the data packet includes a content to be forwarded to a content reception node having a function of receiving a particular content based on second identification information, the second identification information indicating that use of a content included in the data packet on the content receiving node is permitted,
  duplicate the data packet when the first and the second identification information is added to the same data packet,
  forward one data packet after being duplicated through the network to the reception unit, and the other data packet after being duplicated through the network to the content receiving node, when the first and the second identification information is added to the same data packet,
  forward the acquired data packet including the content through the network only to the reception unit, when the second identification information is not added to the data packet,
  use processing for hierarchically structuring the part of the content, the use of which on the content receiving node is determined to be permitted, to divide the part of the content into a basic portion and an enhanced portion including information for compensating an amount of information on the basic portion in order to create a data packet including the basic portion and a data packet including the enhanced portion,
  encrypt the data packet including the basic portion by using such a key that can be decrypted at both the reception unit and the content receiving node, and encrypt the data packet including the enhanced portion by using such a key that cannot be decrypted at the content receiving node, and
  add first identification information and second identification information to the data packet including the basic portion and the data packet including the enhanced portion, where the first identification information indicates that the data packet is a packet to be transmitted in high priority and broadband, and the second identification information indicates that the content included in the data packet is usable on the content receiving node.

16. The network node according to claim 15, further configured to make, with the content transmission device, a setting for performing priority control on transmission of a data packet including the content provided to the content receiving node in compensation for the content provided by the content transmission device to the content receiving node.

* * * * *